M. MEDERER.
CHILLING AND PRESERVING CHAMBER.
APPLICATION FILED APR. 21, 1909.
953,343.
Patented Mar. 29, 1910.
3 SHEETS—SHEET 1.
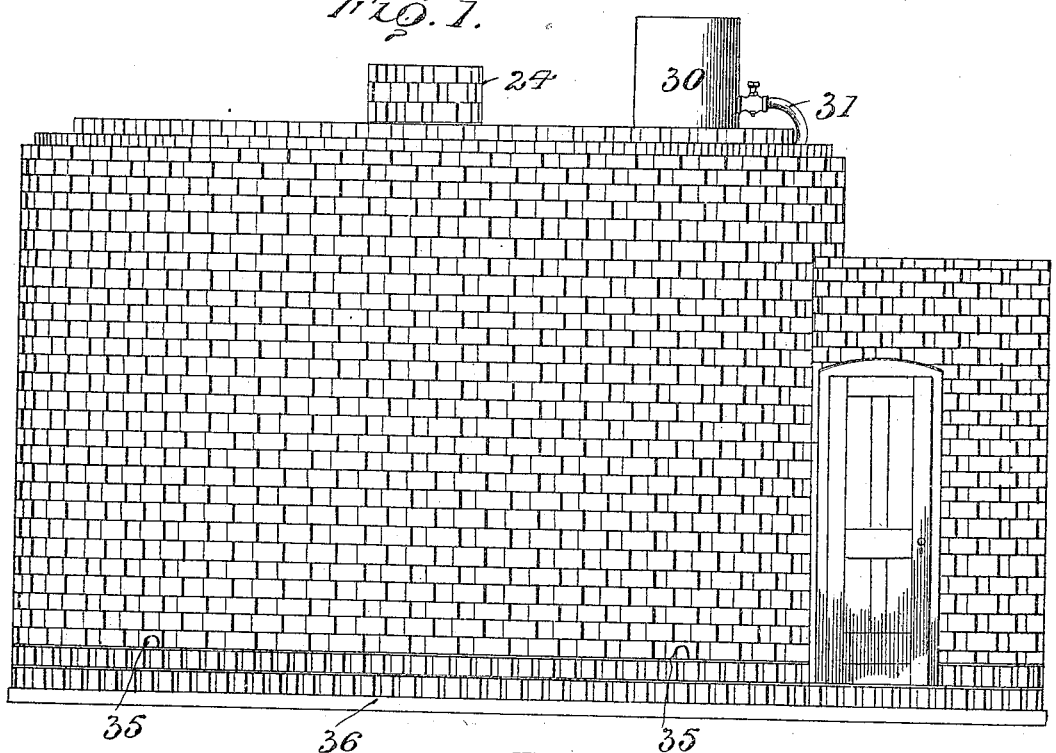
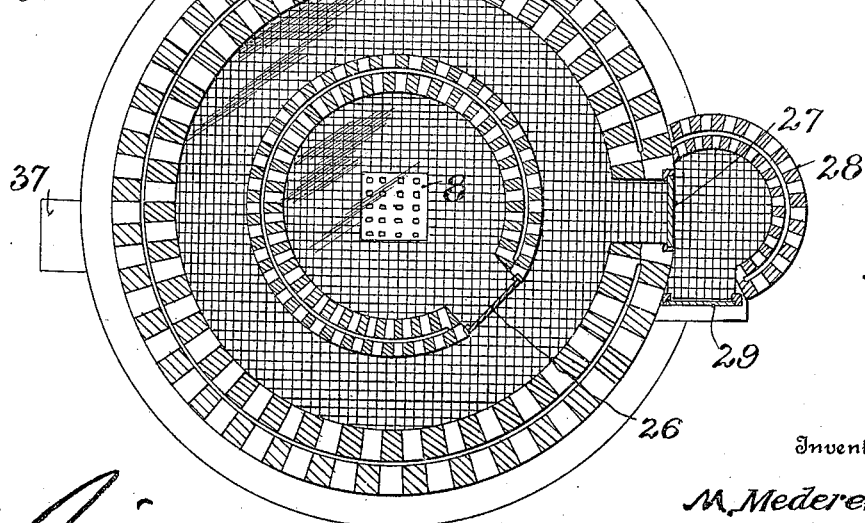

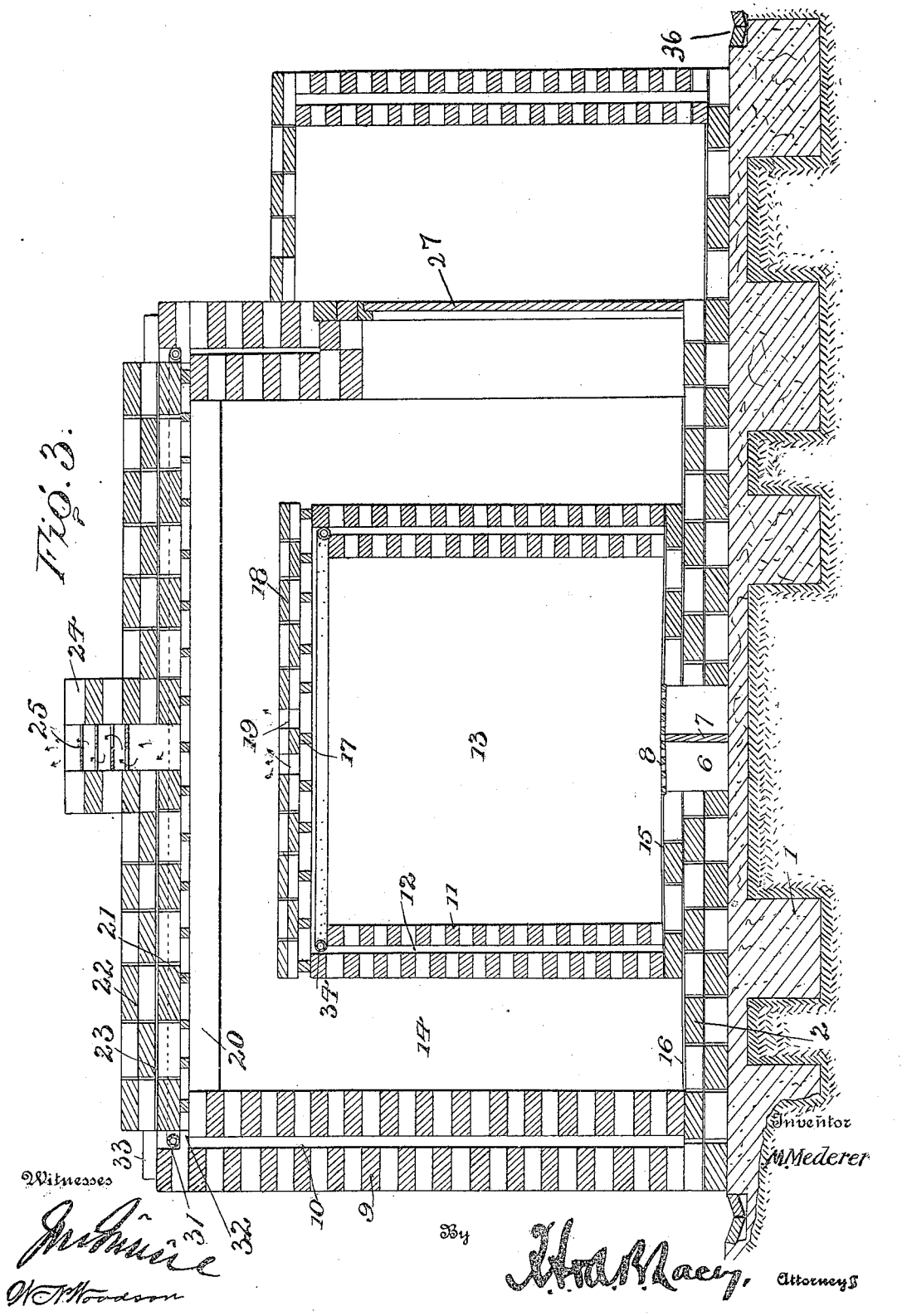

M. MEDERER.
CHILLING AND PRESERVING CHAMBER.
APPLICATION FILED APR. 21, 1909.
953,343.
Patented Mar. 29, 1910.
3 SHEETS—SHEET 3.
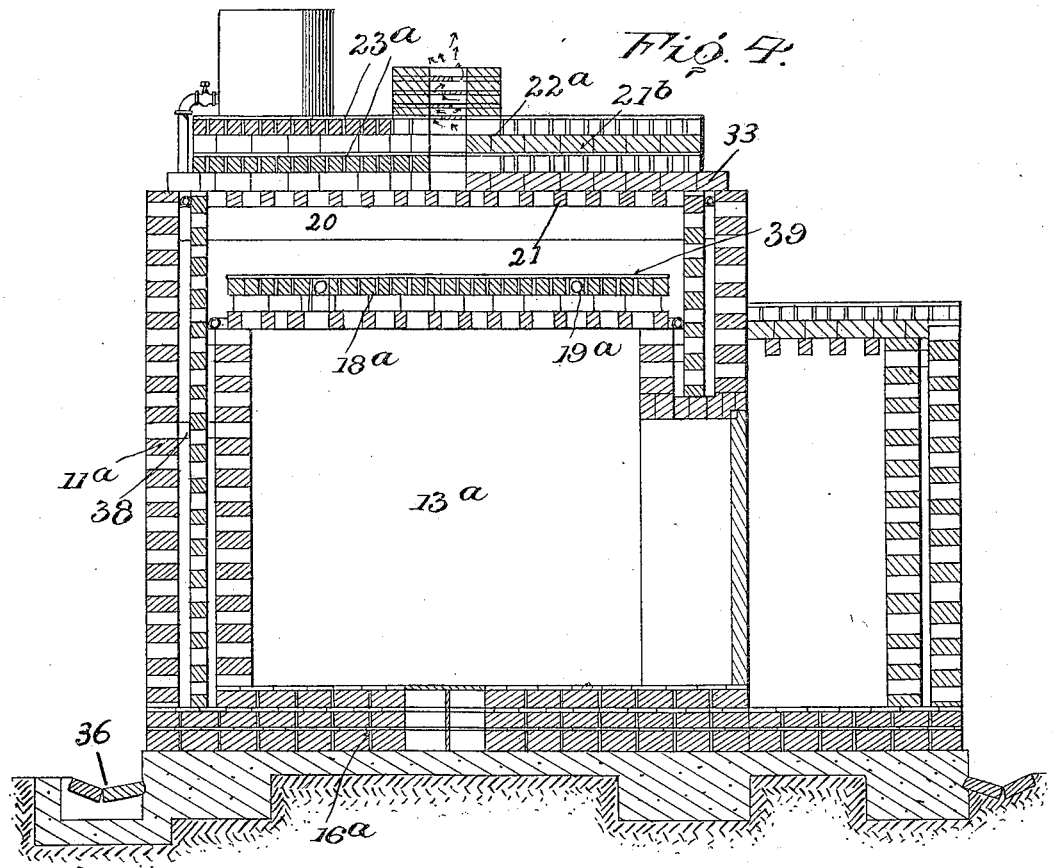
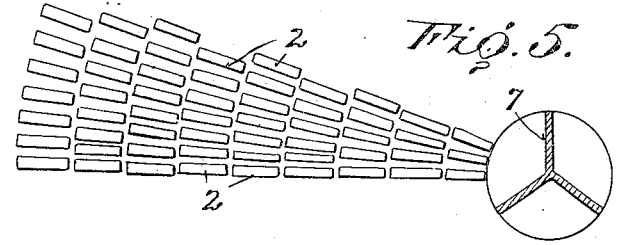
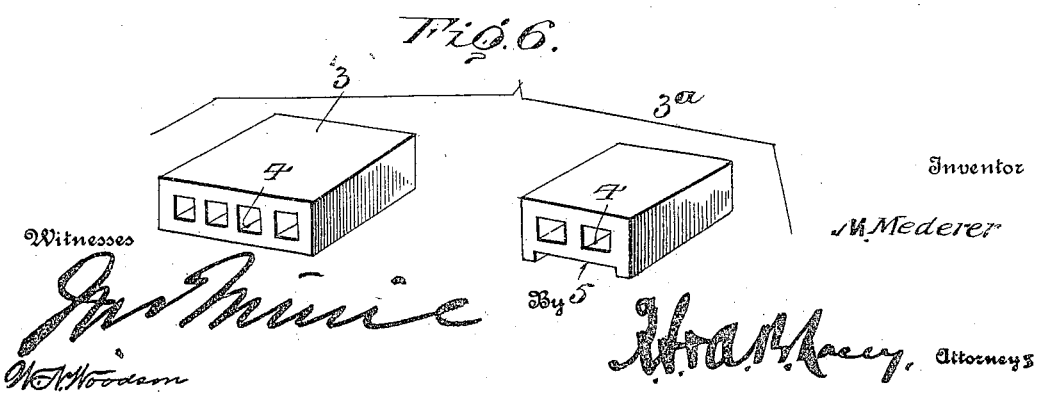

UNITED STATES PATENT OFFICE.

MAX MEDERER, OF BLOEMFONTEIN, ORANGE RIVER COLONY.

CHILLING AND PRESERVING CHAMBER.

953,343.  Specification of Letters Patent. Patented Mar. 29, 1910.

Application filed April 21, 1909. Serial No. 491,319.

*To all whom it may concern:*

Be it known that I, MAX MEDERER, subject of the King of Great Britain, residing at Bloemfontein, in the District of Bloemfontein, Orange River Colony, South Africa, have invented certain new and useful Improvements in Chilling and Preserving Chambers, of which the following is a specification.

This invention comprehends certain new and useful improvements in storage chambers for provisions, meats and other perishable goods, and the invention has for its object an improved structure forming one or more chilling or refrigerating chambers adapted to preserve by a natural process without the aid of chemicals or ice the perishables stored therein. And a further object of the invention is an improved structure of this character which will be effectually insulated from the earth, and which will provide for a lowering of the temperature by a rapid evaporation of water, as well as maintaining complete and effective ventilation and draft, and protection from radiation. And the invention also consists in certain constructions and arrangements of the parts that I shall hereinafter fully describe and claim.

For a full understanding of the invention, reference is to be had to the following description and accompanying drawings in which:

Figure 1 is a side elevation of a structure embodying the improvements of my invention; Fig. 2 is a horizontal sectional view thereof on a reduced scale; Fig. 5 is a vertical longitudinal section; Fig. 4 is a similar view of a modified form of structure; Fig. 5 is a fragmentary plan view; and, Fig. 6 illustrates in perspective two forms of perforated bricks that may be employed.

Corresponding and like parts are referred to in the following description and indicated in all the views of the accompanying drawings by the same reference characters.

The building structure forming my chilling and preserving chamber or chambers may be of any desired material and size according to the requirements of the particular case, and may also be of any shape either portable or fixed. The structure embodies, in the present instance, a foundation 1 built on the surface of the ground and preferably formed of stone with footings below the ground, all along the walls. The top surface of said fountain slopes outwardly in all directions from the center to the outside circumference of the building. The floor 2 of the building is composed of bricks preferably laid on edge and arranged in concentric circles with spaces between all of the bricks so as to provide passages or channels. If desired, specially constructed bricks may be used for the floor 2 as well as for the other parts of the building. Fig. 6 illustrates two forms of these bricks. In one of these forms designated 3 there are any desired number of air passages 4 extending therethrough, and in the other form designated 3$^a$ in addition to the air passages 4 there is a complete channel through the bed of the brick as indicated at 5. The floor or floors according as the structure is provided with one or more chambers all slope from the center of the chamber or chambers outwardly. As each brick is supported a slight distance from the adjoining bricks, ventilating insulation is provided, and the arrangement of these bricks provides drafts of air. The drafts of air due to the natural drawing of evaporation in the chamber or chambers are driven inwardly, that is, centrally, and toward a well 6 which is formed in the center of the floor. This well is preferably divided into three or more compartments by partitions 7, so as to prevent the air drafts from materially interfering with each other, that is, from passing straight across from one side of the structure to the opposite side. The air below the floor becomes moistened and sterilized as it endeavors to pass around each concentric ring of bricks, obeying the impulse of these drafts and upon reaching the well 6 with its three vertically disposed partitions, the moistened air, (being lighter than dry air) escapes upwardly and by means of the only outlet provided for it passes through a grating 8 at the top of the well.

The wall or walls of the structure are double, and may be of any desired number, two being shown in that embodiment of the invention which is illustrated in Fig. 3. In this form 9 designates the outer wall which is arranged with outer and inner tiers of bricks 11, the bricks being preferably formed with air passages (or arranged so as to provide air passages), and being also arranged that the air passages of the outer tier will be in staggered relation with the air passages of the inner tier so as to effectually preclude shafts of light penetrating the interior of the building. 10 designates the air spaces between the inner and outer tiers of the outer wall. The inner wall is correspondingly formed, and is provided with a corresponding air space 12 between its inner and outer tiers. The provision of outer and inner walls produces an inner chamber 13, and an outer chamber 14 surrounding the inner chamber and separate therefrom. In the present instance, the floor of the inner chamber 13 is higher than the floor of the outer chamber 14, although not necessarily so, and as above stated, the floors slope outwardly from the center. The floor of the inner chamber is covered with tiles 15 and the floor of the outer chamber is correspondingly covered with tiles as indicated at 16, the courses of the tiles being preferably imperforate.

The roof of the inner chamber 13 comprises joists 17 and one or two courses of preferably perforated bricks 18 laid on said joists, vent flues 19 being formed through the roof at intervals. The outer chamber has its individual roof which is spaced from the roof of the inner chamber and which may be constructed of two sets of joists 20 and 21 set at right angles to each other and supported on the outer wall 9, one or two courses of bricks 22 (preferably perforated) being supported on said joists as well as an intermediate course of tiles 23. The outer roof is provided with a shaft 24 which is centrally located in the present instance and which forms an opening leading from the outer chamber to the atmosphere. A series of baffles 25 are mounted in this shaft so as to exclude the light from passing through the shaft into the chamber.

The inner chamber 13 is provided with its own individual door 26 as is also the chamber 14 in which the door is seen at 27. The structure is preferably provided with a vestibule 28, the walls, floor and roof whereof are preferably constructed like the walls, floor and roof of the main structure, the porch being also provided with its own individual entrance door 29 preferably light tight. The doors 26 and 27 are preferably out of alinement with each other and the door 29 is also out of alinement with the door 27 and is preferably positioned at right angles thereto. This arrangement of doors preferably prevents light from entering the chambers, as one door will be closed before the other is opened, and the inflow of warm air is also thereby prevented.

In order to carry water to the top of the building, I have shown in the present instance a water tank 30 mounted on the roof of the structure, a water supply pipe 31 of any desired construction being connected to the tank passing around the structure and over the air space 10, the said pipe being formed with orifices through which the water may flow to dampen the building. This pipe 31 may be supported in any desired way, as by stirrups 32 which project inwardly from some of the bricks of the outer wall, or by extensions of any of the joists. It is preferably covered after being placed in position, by a series of loose bricks 33 as clearly illustrated in the drawings. The inner chamber 13 is similarly provided with a spray pipe designated 34 which may receive its supply of water in any desired way. It is to be understood that any other form of sprinkler may be used, or the building dampened in any manner; it is also to be understood that the water may be applied to the outer surface of the building as well as to the air spaces between the inner and outer tiers of the wall. The outer wall of the structure is formed with drainage openings 35 extending therefrom and leading to a relatively shallow gutter 36, the gutter extending around the building and finally emptying into a catch pit 37, this merely being for the purpose of conserving the water supply.

A modification of my invention is illustrated in Fig. 4, wherein a structure is illustrated having only one chamber designated 13ª, the walls of which are constructed substantially like the structure hereinbefore described, except that the several courses of the floor (of that form illustrated in Fig. 4) may be overlaid with imperforate tiling such as that indicated at 16ª. The wall 11ª of the chamber 13ª is composed of three tiers preferably spaced from each other the bricks being staggered to exclude the light and the tiers reinforced or strengthened by filling blocks 38. In this modified structure, there is also an inner roof 18ª which embodies a plurality of courses of bricks with air passages extending at right angles to each other in the respective courses, the said roof being covered with tiling 39 and formed with any desired number of vent flues 19ª. This modified form is also provided with an outer roof which only differs from the roof illustrated in Fig. 3 in that the modified form embodies a plurality of courses of bricks 22ª, the spaces between the bricks of one course being at right angles to the spaces between the bricks of the next adjacent course. Over and between the courses of bricks 22ª there is closely laid tiling 23ª.

It is to be understood that only a small quantity of water is required, as the structure is not to be flooded but only maintained in a moist condition. The moistening of the wall and floors soaks the chamber and gives rise to a beneficial circulation of cool air, the drafts traveling inwardly through the wall and also inwardly and upwardly through the floor, and eventually escaping out through the shaft at the top of the building.

Experiment has shown that my improved cooling chamber not only cools and resists the decay of goods stored therein, but in some cases exerts an active preservative influence on the goods. It may also be mentioned that in spite of the presence of moisture, the chamber possesses the property of preventing the formation of mildew upon its contents.

Having thus described the invention, what I claim is:

1. A storage structure provided with walls which comprise two tiers with intervening air spaces, said walls being composed of bricks formed with transversely extending openings establishing communication between the interior of the structure and the surrounding air and the bricks of one tier being set opposite to the openings of the adjacent tier, and means for spraying water into the spaces between the two tiers.

2. A storage structure embodying a chamber, the floor of which is constructed of bricks laid in concentric rows, with air spaces between, said air passages leading inwardly from the exterior of the building to the center thereof and the building being provided at the center of the floor with an air well in communication with said passages, and means for moistening the walls and floor of the structure.

3. A storage structure embodying a chamber the floor of which is constructed of bricks laid in concentric rows with air spaces between, said spaces constituting air inlet passages leading from the exterior of the building to the center thereof and the structure being provided at the center of the floor with a well, leading up into the interior of the chamber, partitions in said well for the purpose specified, and means for moistening the walls and the floor of the structure.

4. A storage structure embodying vertical walls formed with openings extending therethrough and establishing communication between the interior of the structure and the surrounding air, joists supported on said walls, a water spray pipe supported on said walls and arranged to sprinkle the same and a roof supported by said joists and consisting of a plurality of courses of bricks with air passages between the bricks of each course.

In testimony whereof I affix my signature in presence of two witnesses.

MAX MEDERER. [L. S.]

Witnesses:
M. C. GIE,
P. E. KAMPHACTS.